United States Patent
Chen

(10) Patent No.: US 9,949,124 B1
(45) Date of Patent: Apr. 17, 2018

(54) METHOD AND DEVICE FOR AUTHENTICATING WIRELESS PAIRING AND/OR DATA TRANSFER BETWEEN TWO OR MORE ELECTRONIC DEVICES

(71) Applicant: Zihan Chen, Charlottesville, VA (US)

(72) Inventor: Zihan Chen, Charlottesville, VA (US)

( * ) Notice: Subject to any disclaimer, the term of this patent is extended or adjusted under 35 U.S.C. 154(b) by 0 days.

(21) Appl. No.: 15/494,962

(22) Filed: Apr. 24, 2017

(51) Int. Cl.
| | |
|---|---|
| *G06F 21/44* | (2013.01) |
| *H04L 29/06* | (2006.01) |
| *H04W 76/02* | (2009.01) |
| *H04W 12/06* | (2009.01) |
| *H04L 29/08* | (2006.01) |
| *G06F 3/01* | (2006.01) |
| *G06F 21/31* | (2013.01) |
| *H04W 4/00* | (2018.01) |

(52) U.S. Cl.
CPC ............ *H04W 12/06* (2013.01); *G06F 3/017* (2013.01); *G06F 21/316* (2013.01); *H04L 63/0861* (2013.01); *H04L 63/0869* (2013.01); *H04L 67/04* (2013.01); *H04L 67/12* (2013.01); *H04L 67/22* (2013.01)

(58) Field of Classification Search
CPC ... H04W 76/023; H04W 12/06; H04W 4/008; H04L 67/12; H04L 67/22; H04L 67/04; H04L 63/0869; H04L 63/0861; H04L 9/3297; H04L 41/0806; G06F 19/3406; G06F 3/017; G06F 21/316
See application file for complete search history.

(56) References Cited

U.S. PATENT DOCUMENTS

| | | | | |
|---|---|---|---|---|
| 7,881,295 B2 * | 2/2011 | Fry | ................... | H04L 29/12254 370/392 |
| 7,907,901 B1 * | 3/2011 | Kahn | .................. | H04M 1/7253 455/41.1 |
| 8,170,212 B2 * | 5/2012 | Pering | ................... | H04L 9/0827 380/255 |

(Continued)

FOREIGN PATENT DOCUMENTS

FR              2984654 A1     6/2013

OTHER PUBLICATIONS

Peng, Chunyi, et al. "Point&Connect: intention-based device pairing for mobile phone users." Proceedings of the 7th international conference on Mobile systems, applications, and services. ACM, 2009.*

(Continued)

*Primary Examiner* — Michael Simitoski
(74) *Attorney, Agent, or Firm* — Woods Rogers PLC; Nathan A. Evans

(57) ABSTRACT

An authentication system for pairing two or more electronic devices is taught whereby two or more devices, such as cellular phones, receive a first vibration or motion and register a first event, they receive a second vibration or motion and register a second event, the said two or more devices pair or otherwise recognize devices that received first event and second event based on the detected interval between the first and second events. By measuring the interval or phase between two vibration or motion events, the current invention allows pairing without complex movement, without a great amount of a user's attention on the interfaces of the devices, and without the need for compensation between differences in the clocks internal to the devices.

14 Claims, 13 Drawing Sheets

(56) References Cited

U.S. PATENT DOCUMENTS

| | | | | |
|---|---|---|---|---|
| 8,312,392 B2* | 11/2012 | Forutanpour | G06F 1/1694 | 715/733 |
| 8,339,363 B2* | 12/2012 | Krum | G06F 1/1626 | 345/158 |
| 8,542,827 B2 | 9/2013 | Razzell | | |
| 8,665,877 B2* | 3/2014 | Fry | H04L 29/12254 | 370/392 |
| 8,692,789 B2* | 4/2014 | Chen | G06F 3/04883 | 345/173 |
| 8,843,649 B2* | 9/2014 | Bailey | H04W 12/06 | 709/229 |
| 8,897,704 B1 | 11/2014 | Kahn et al. | | |
| 9,140,599 B1* | 9/2015 | Beckman | G01H 1/003 | |
| 9,374,841 B2* | 6/2016 | Chang | H04W 76/023 | |
| 9,467,850 B2 | 10/2016 | Deisher | | |
| 9,594,443 B2* | 3/2017 | VanBlon | G06F 3/03545 | |
| 2005/0093868 A1* | 5/2005 | Hinckley | G06F 3/011 | 345/502 |
| 2006/0267860 A1* | 11/2006 | Rinaldo, Jr. | H04L 63/0492 | 345/1.2 |
| 2007/0188323 A1* | 8/2007 | Sinclair | G06F 21/445 | 340/568.1 |
| 2007/0213045 A1* | 9/2007 | Hermansson | G06F 1/1613 | 455/425 |
| 2009/0215397 A1* | 8/2009 | Thorn | G06F 1/1626 | 455/41.2 |
| 2010/0167646 A1* | 7/2010 | Alameh | G06F 3/017 | 455/41.2 |
| 2010/0199092 A1* | 8/2010 | Andrus | H04L 9/0844 | 713/171 |
| 2010/0248692 A1* | 9/2010 | Keller | H04W 4/08 | 455/412.1 |
| 2011/0126009 A1* | 5/2011 | Camp, Jr. | H04L 9/0825 | 713/168 |
| 2011/0126014 A1* | 5/2011 | Camp, Jr. | H04M 1/7253 | 713/171 |
| 2011/0183706 A1* | 7/2011 | Jung | H04M 1/72522 | 455/550.1 |
| 2011/0189981 A1* | 8/2011 | Faith | G06F 1/1694 | 455/414.1 |
| 2011/0191237 A1* | 8/2011 | Faith | G06F 1/1694 | 705/39 |
| 2011/0191823 A1* | 8/2011 | Huibers | H04W 4/00 | 726/3 |
| 2011/0314153 A1* | 12/2011 | Bathiche | H04L 63/08 | 709/225 |
| 2012/0050153 A1* | 3/2012 | Dvortsov | H04W 12/04 | 345/156 |
| 2012/0135680 A1* | 5/2012 | Deluca | H04B 5/0031 | 455/41.1 |
| 2012/0190299 A1* | 7/2012 | Takatsuka | H04B 5/00 | 455/41.1 |
| 2012/0240042 A1* | 9/2012 | Migos | G06F 3/017 | 715/702 |
| 2012/0254987 A1* | 10/2012 | Ge | H04L 63/0492 | 726/19 |
| 2012/0317297 A1* | 12/2012 | Bailey | H04W 12/06 | 709/229 |
| 2013/0090065 A1* | 4/2013 | Fisunenko | G06F 3/017 | 455/41.2 |
| 2013/0171935 A1* | 7/2013 | Tsai | H04W 12/04 | 455/41.2 |
| 2013/0282306 A1* | 10/2013 | Kao | H04W 76/023 | 702/33 |
| 2014/0006954 A1* | 1/2014 | Raffa | G06F 3/04883 | 715/733 |
| 2014/0223549 A1* | 8/2014 | Quintanilla | G06F 21/31 | 726/19 |
| 2014/0235171 A1* | 8/2014 | Molettiere | H04B 7/26 | 455/41.2 |
| 2014/0267009 A1* | 9/2014 | DeLean | G06F 3/017 | 345/156 |
| 2014/0282068 A1* | 9/2014 | Levkovitz | G06Q 20/223 | 715/748 |
| 2014/0359272 A1* | 12/2014 | Hiltunen | G09C 1/00 | 713/150 |
| 2015/0024678 A1* | 1/2015 | Chang | H04W 76/023 | 455/39 |
| 2015/0230075 A1* | 8/2015 | Reunamaki | H04W 8/005 | 455/41.2 |
| 2015/0264569 A1* | 9/2015 | Toyota | H04W 12/06 | 726/7 |
| 2015/0382388 A1* | 12/2015 | Legallais | H04W 76/023 | 455/411 |
| 2016/0105923 A1* | 4/2016 | Chen | H04W 88/02 | 455/41.2 |
| 2016/0344712 A1* | 11/2016 | Ding | G06F 21/44 | |
| 2017/0201931 A1* | 7/2017 | Swanzey | H04W 48/10 | |
| 2017/0214780 A1* | 7/2017 | Gofman | H04M 1/7253 | |

OTHER PUBLICATIONS

Rene Mayrhofer and Hans Gellersen, Shake Well Before Use: Authentication Based on Accelerometer Data, Pervasive Computing, 2007, 144-161, Lecture Notes in Computer Science, vol. 4480, Spring, Berlin, Heidelberg, United Kingdom.

* cited by examiner

FIG 8

METHOD AND DEVICE FOR AUTHENTICATING WIRELESS PAIRING AND/OR DATA TRANSFER BETWEEN TWO OR MORE ELECTRONIC DEVICES

BACKGROUND

Field of the Invention

The present invention is a system and method, authenticating, pairing or otherwise linking two electronic devices having an accelerometer, gyroscope, or other motion sensing feature(s). Oftentimes, the electronic devices are required to authenticate each other in order to pair wirelessly, to transfer data, to execute intended functions, or to perform other tasks. Current methods of authentication for wireless pairing and/or data transfer between devices usually require a certain amount of a user's attention and operation during the process. However, disclosed herein, is an invention for pairing that is user-friendly, intuitive, fast, easy, and convenient, as well as more safe and secure than currently existing methods.

Description of the Related Art

Prior to the invention disclosed herein, methods for pairing electronic devices taught using motions or vibrations to create interaction between the devices. However, the motions or vibrations were complex and frequently did not lead to accurate pairing. In some cases, a motion or vibration was caused that required the two or more devices to account for differences in the clocks between the devices. For example, if an Apple iPhone was being paired to a Samsung Galaxy phone, and the internal clocks were not synchronized, differences in time had to be accounted for using a complicated algorithm, or the devices could not be authenticated at all.

In other prior art, to authenticate pairing of devices, the devices required encrypted wireless connection technology, such that the devices only allowed for authentication if encoded wireless means allowed for sharing, including radio, Bluetooth, wifi, or other wireless connection technology. In the current state of the art, not all devices will allow for such pairing, because some companies consider their wireless pairing systems to be proprietary; for example, in some situations an Apple iPhone cellular phone will not pair with a Samsung Galaxy cellular phone. In sum, pairing compatibility remains an issue with cellular phone authentication between devices from different manufacturers.

Thus, the need exists for a pairing system that does not require complex motions, adjustments to internal clocks, and/or encrypted, proprietary wireless signals to be shared between the devices in order to authenticate.

SUMMARY OF THE INVENTION

The object of the present invention is to provide an authentication system for pairing two or more electronic devices comprising: a user creates a first vibration or motion; two or more devices receive first vibration or motion and register first event; a user creates a second vibration or motion; said two or more devices receive second vibration or motion and register second event; said two or more devices pair or otherwise recognize or associate together devices that received first event and second event if interval or phase between said first event and second event is identical or nearly identical. In some cases, there is no user in the typical sense of the word, because the vibrations or motions might not come directly from a user, but rather will automatically occur in certain circumstances and be used by devices to authenticate pairing.

By measuring the interval or phase between two vibration or motion events, the current invention allows pairing without complex movement, without a great amount of a user's attention on the interfaces of the devices, without encrypted, proprietary electronic signals being necessary between the two devices to authenticate pairing, and without the need for compensation between differences in the clocks internal to the devices.

BRIEF DESCRIPTION OF THE DRAWINGS

The accompanying drawings illustrate certain aspects of some of the embodiments of the present invention, and should not be used to limit or define the invention. Together with the written description the drawings serve to explain certain principles of the invention.

FIG. 8 shows an example of how inputs can be used to authenticate pairing of the devices and/or transfer of data, even if the two devices are not synchronized to the same clock.

DETAILED DESCRIPTION OF VARIOUS EMBODIMENTS OF THE INVENTION

Figure 1:
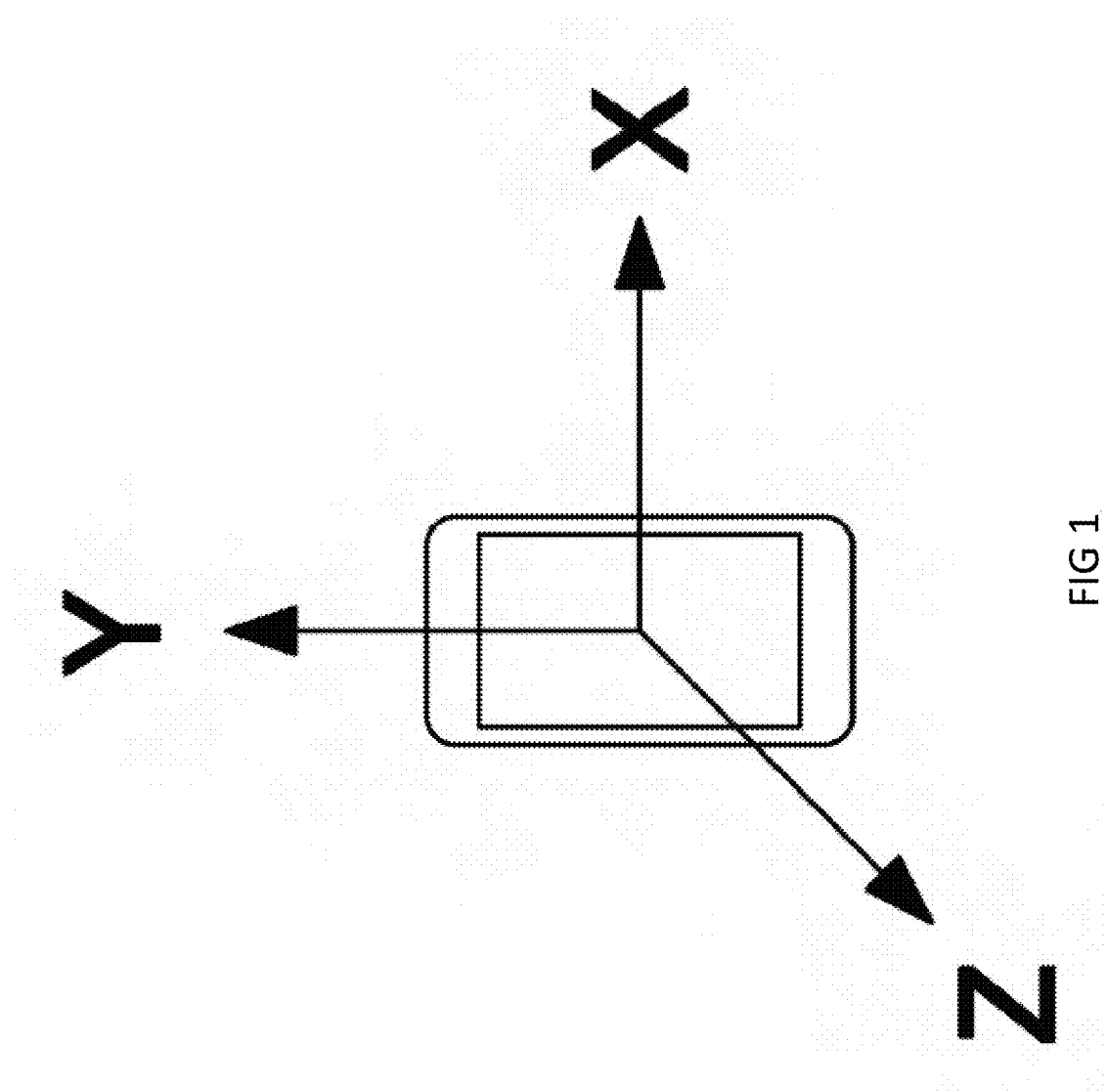
FIG. 1 is a depiction of the an exemplary candidate device showing three axes of movement and/or vibration.

The present invention has been described with reference to particular embodiments having various features. It will be apparent to those skilled in the art that various modifications and variations can be made in the practice of the present invention without departing from the scope or spirit of the invention. One skilled in the art will recognize that these features may be used singularly or in any combination based on the requirements and specifications of a given application or design. Embodiments comprising various features may also consist of or consist essentially of those various features. Other embodiments of the invention will be apparent to those skilled in the art from consideration of the specification and practice of the invention. The description of the invention provided is merely exemplary in nature and, thus, variations that do not depart from the essence of the invention are intended to be within the scope of the invention.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

A method for authenticating wireless pairing and/or data transfer between two or more devices is taught herein, the method comprising the steps of having two or more candidate devices ready for pairing and/or data transfer; the two or more candidate devices detecting two or more motion or vibrational input(s); the as-detected two or more motion or vibrational input(s) by the two or more candidate devices being processed as identification information for communication and authentication between the two or more candidate devices. The motion input(s) may be, but are not limited to, one or a combination of the following: vibration, acceleration, tilt, rotation, a biometric motion input, and/or the deformation of a flexible, foldable, and/or stretchable device. In some aspects, the generation of the motion input(s) is based on the contact between the candidate devices. In other aspects, the generation of the motion input(s) is not based on the contact between the candidate devices. In aspects, the inputs registered by the two or more devices include, but are not limited to, sound, activating physical or virtual buttons, activating GUI controlling objects, activating or using a camera, visual cues, swiping on the device or otherwise interacting with the device screen or device keyboard, or any other input that could create an interval between two or more points of time when inputs are generated.

In a preferred embodiment, the motion input(s) are generated by the user(s) who intend to pair the two or more candidate devices. In one aspect, the user(s) are provided with instructions on the generation of the motion input(s). For example, the instructions on the generation of the motion input(s) are displayed on at least one of the candidate device(s). In some cases, two or more of the candidate devices pair and/or transfer data successfully if the similarity of the motion input(s)—including but not limited to vibration, vibration pattern, and/or vibration frequency—of any two or more of the candidate devices reach a predetermined threshold value or are similar in degree and/or nature.

In a preferred embodiment, the time(s) of the critical moment(s) of the one or more motions input(s) of each of the two or more candidate devices are processed as identification information and then are communicated between the two or more candidate devices for authentication. By way of example, the critical moment(s) of the one or more motions input(s) can be, but are not limited to, one or a combination of the following: a similar or identical vibration, vibration pattern, or vibration frequency; the change of the direction of the motion input(s); and/or the reach of motion input to the threshold value(s). In one embodiment, a user my place two devices on a table or other surface and hit, bang, or otherwise cause the surface to vibrate. The vibration, vibration frequency, vibrations, or pattern(s) of vibration will be received by both devices and the timing and characteristics of the vibrations will be measured by both devices. If the vibrational characteristics and timing between vibrations are near or exact in nature, the pairing of the devices will be authenticated. A similar way of pairing devices can be achieved by motion(s) other than vibrations.

In one embodiment, candidate devices may authenticate, pair, and/or transfer data successfully if at least one of the time(s) of the critical moment(s) matches, with a tolerance error under a predetermined value. Candidate devices may authenticate, pair, and/or transfer data successfully if at least a predetermined amount of the time(s) of the critical moment(s) matches, with a tolerance error under a predetermined value. The times on the devices may be determined in any manner that time is typically calculated on electronic devices. For example, the time of at least one of the candidate devices may be determined by local time (time in the local system) or otherwise by clocks or timers on the candidate devices. The time of at least one of the candidate devices may be received from the Internet. The time of at least one of the candidate devices may be by stopwatch, clock, timer, or any other manner in which time or a moment may be captured on an electronic device.

In aspects in which the interval(s) or phase(s) in between the critical moment(s) of the two or more motions input(s) of each of the two or more candidate devices are processed as identification information and then are communicated between the two or more candidate devices for authentication, the critical moment(s) of the one or more motions input(s) can be, but are not limited to, one or a combination of the followings: the change of the direction of the motion input(s), the degree of a change or changes in direction of the motion input(s), the reach of motion input(s) to threshold value(s), vibration(s), vibration(s) frequency or frequencies, and/or pattern(s) of vibration(s). Two or more candidate devices may authenticate, pair, and/or transfer data successfully if at least one of the interval(s) in between the critical moment(s) or motion input(s) matches, within a tolerance error level of a predetermined value. In one embodiment, a tolerance value might be below 0.2 seconds. In another embodiment, a tolerance value might be above 0.2 seconds. In other embodiments, tolerance values may be from 0.2 to 0.3 seconds, from 0.3 to 0.4 seconds, from 0.4 to 0.5 seconds, from 0.5 to 0.6 seconds, and so on. Two or more candidate devices may authenticate, pair, and/or transfer data successfully if at least a predetermined amount of the interval(s) in between the critical moment(s) or motion input(s) matches, with a tolerance error under a predetermined value. Similarly, two or more candidate devices may authenticate, pair, and/or transfer data successfully if one, more than one, or a predetermined amount, of the interval(s) in between the critical moment(s) or motion input(s) matches, with a tolerance error under a predetermined value. In embodiments, one interval between critical moment(s) or motion input(s) must match or be close in time, two intervals between critical moment(s) or motion input(s) must match or be close in time, three intervals between critical moment(s) or motion input(s) must match or be close in time, and so on. In another embodiment, the degree and/or nature of the critical moment(s) or motion input(s) at the same or similar time point(s) matters for purposes of authentication, pairing, and/or data transfer.

Similarly, there may be variances or tolerance levels with respect to vibrations or motions, as well as intervals detected between one, two, or more devices. For example, one device to be paired may receive a lower frequency vibration compared to another device to be paired because it is farther away from the source of vibration. In such cases a certain amount of variance is tolerable, such as between 0.1 hertz and 10 kilohertz; moreover, the interval between the two or more events also assures adequate pairing information and communication. Similar variances are allowed for motions, other inputs as taught herein, or even the intervals between motions or vibrations. For example, in reference to FIG. 8, according to the built-in clock of Device A, motion inputs are recorded on Device A at time 2017:03:14:18:59:11.706 and time 2017:03:14:18:59:12.898. Thus, the interval time between the two motion inputs is 01:192 seconds. A similar occurrence happens on Device B; according to the built-in clock of Device B, motion inputs are recorded on Device B at time 2017:03:14:18:59:10.700 and time 2017:03:14:18:59:11.874, so the interval time between the two motion inputs is 01:174 seconds. While the durations of the two intervals are not identical and there is a variance of 00:018, it is of tolerable variability, or considered nearly identical, according to the invention taught herein and the systems of Device A and Device B still pair with one another. Difference in detected durations of the intervals between devices to be paired are tolerable or "nearly identical" if the differences are, for example, within a timing range of between 0 and 2 seconds, such as under 0.01 seconds, between 0.01 and 0.02, between 0.02 and 0.03, between 0.03 and 0.04, between 0.04 and 0.05, between 0.05 and 0.06, between 0.06 and 0.07, between 0.07 and 0.08, between 0.08 and 0.09, between 0.09 and 0.1, and so on and so forth up to 2 seconds. Similarly, variances may exist between vibration frequency, motion input, or other gestures or input as contemplated by the invention and/or one of ordinary skill in the art.

In aspects, the motion input(s) may be along either the X axis, Y axis, Z axis, or a combination of any two or three of the X axis, Y axis, or Z axis of the candidate devices. These input(s) may be processed as identification information for communication and authentication purposes. In aspects, the communication(s) for authentication between the two or more candidate devices may be based on short range wireless communication, such as, but not limited to, one or a combination of the following: Bluetooth, NFC, wifi, internet, radio, or any other means of electronically communicating between electronic devices.

In embodiments, one or more of the candidate devices enter authentication or pairing mode responsive to a detection of one or more motion input(s). Motion input(s) can be, but are not limited to, one pattern or a combination of the following: vibration pattern, vibration frequency, vibration, acceleration, tilt, rotation, a biometric motion, a magnetic motion, an electromagnetic motion, a wind motion, a motion detected by the camera component of the device, a motion detected by the pressure sensitive component of the device, a motion created by a user's gesture, and/or the deformation of a flexible, foldable and/or stretchable device. The motion might be acted on part or the whole of the device, or the motion might not be acted on the device (for example, the motion might comprise hand motions captured by the device camera, or a user blinking his/her eyes as captured by the device camera or biometric sensor). In aspects, one or more motion input(s) for activating the authentication or pairing mode of the candidate device is a predetermined amount, degree, and/or nature of vibrations with a minimum or maximum value lower or higher than a predetermined threshold value. In other aspects, the type(s) of the one or more motion input(s) are the same or similar as the type(s) or degree(s) of the one or more motion input(s) processed as identification information for communication and authentication between the two or more candidates devices. In aspects, the one or more motion input(s) are the same or similar as the one or more motion input(s) processed as identification information for communication and authentication between the two or more candidates devices. Measuring the one or more motion input(s) may be accomplished by, but are not limited to, one or a combination of the following: seismometer, accelerometer, gyroscope, and/or biometric input device. Candidate devices include, but are not limited to: cellular telephones, tablets, PDAs, computers, home or office appliances, and/or other electronic devices. Candidate devices may be laptop or desktop computers. Candidate devices may include accessories, such as audio devices, digital home assistants, visual devices, or Virtual Reality devices. Candidate home or office appliances devices include but are not limited to televisions; cable, internet, or satellite boxes; refrigerators and other kitchen appliances; gaming consoles; washing and/or drying machines; printers; copying machines; cellular or landline telephones; answering machines; servers; hard drives; computers; etc. Candidate devices include wearable devices, such as wristbands, watches, headsets, headphones, and/or electronic finger rings, although this list is not limiting. Candidate devices include devices for vehicles, including charging solutions, sound systems, entertainment systems, computer systems, and/or other devices related to vehicles. Candidate devices may also include public service devices, such as an ATM machine, a ticketing machine, an electronic billboard, a wicket machine, a mobile payment terminal, etc.

In situations where the method taught herein is not sufficiently pairing devices and/or transferring data, the candidate device may request a code as a substitute way of authentication.

Now turning to the figures, FIG. 1 is a depiction of the an exemplary candidate device, such as a cellular phone, showing three axes of movement and/or vibration.

Figure 2:
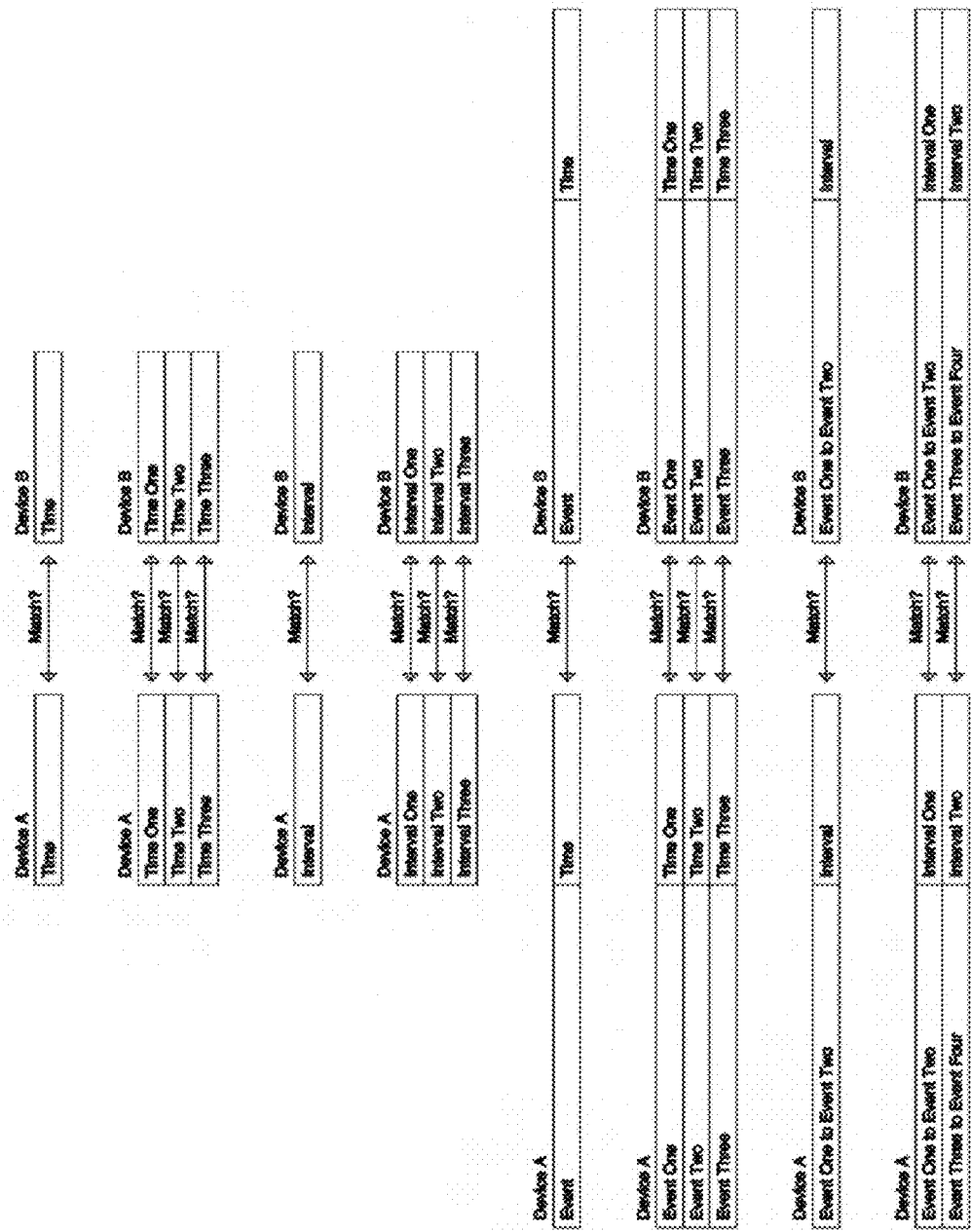
FIG. 2 is a chart depicting how input at different time intervals, such as vibrations, can be recognized by candidate devices and the interval between such input can be used to authenticate pairing of the devices and/or transfer of data.

FIG. 2 is a chart depicting how input at different time intervals, such as vibrations, can be recognized by candidate devices and the interval between such input can be used to authenticate pairing of the devices and/or transfer of data. For example, Device A may receive input, such as a vibration, vibration pattern, or motion, at Time One, and Device B will also receive the same or similar input at Time One. Device A will receive another input or more than one input, such as a vibration(s), vibration pattern(s), or motion(s), at Time Two, and Device B will also receive the same or similar input at Time Two. If the same or similar input is detected by Device A and Device B, and the interval between the two or more inputs is the same or similar, the devices are authenticated. This may occur for two inputs, three inputs, four inputs, and so on, and the corresponding time intervals between those inputs.

Figure 3:
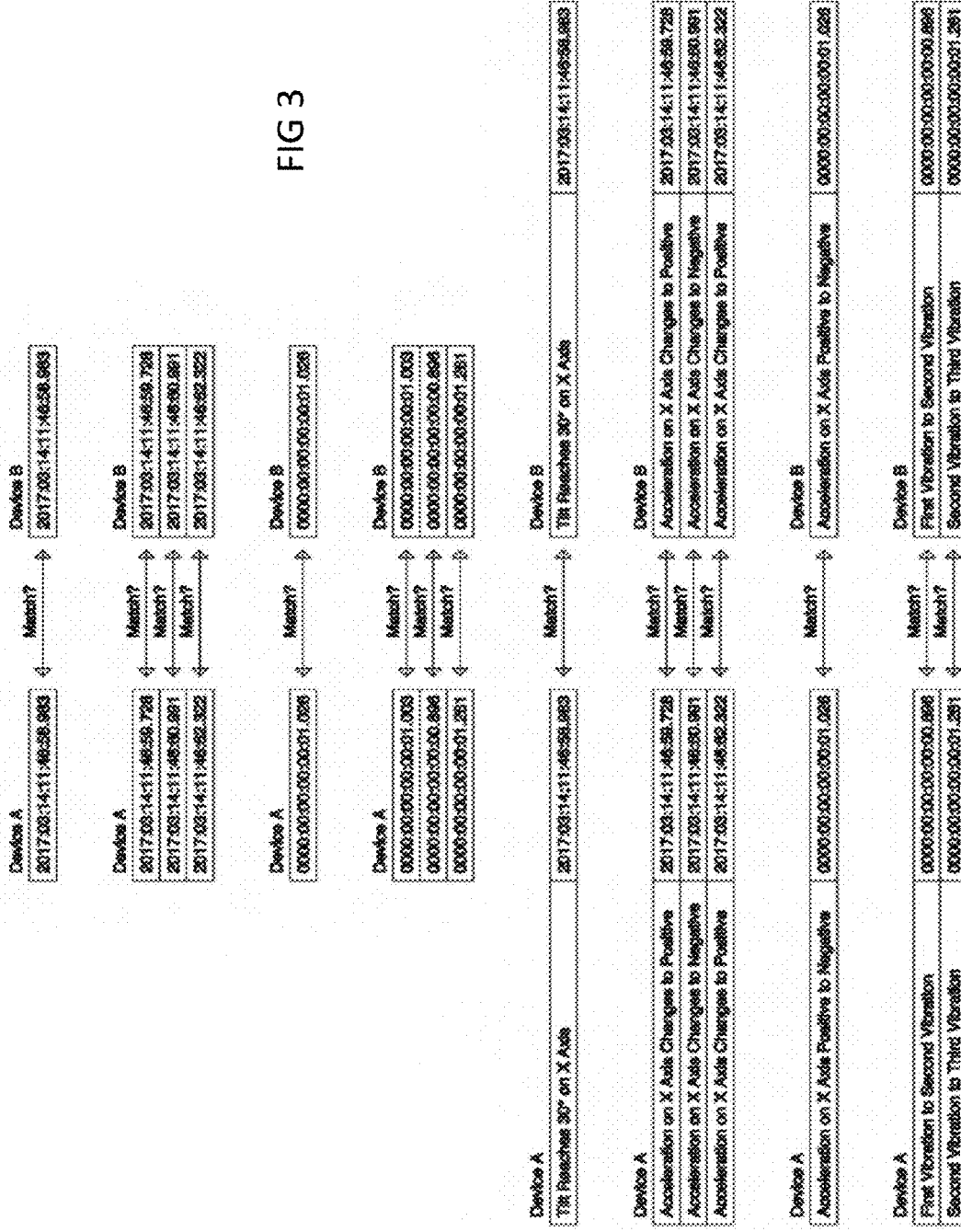
FIG. 3 is a chart further depicting how timing mechanisms on candidate devices, such as clocks and/or timers, can be used to measure interval(s) between inputs.

FIG. 3 is a chart further depicting how timing mechanisms on candidate devices, such as clocks and timers, can be used to measure interval(s) between inputs. For example, at Time One, Device A and Device B may receive input and that input is recorded at a certain first time. At Time Two, Device A and Device B may receive another input and that input is recorded at a certain second time. In a preferred embodiment, the inputs at Time One should be identical or nearly identical inputs, such as a vibration at a similar degree of vibration velocity, acceleration, and/or displacement, or a vibration at a similar frequency (such as in Hertz). If the interval or time period between these identical or nearly identical inputs is the same or nearly the same, Device A and Device B will be authenticated to pair or transfer data. Similarly, this may apply to inputs at Time One, Time Two, Time Three, and so on, and time periods or intervals between Time One and Time Two, Time Two and Time Three, Time One and Time Three, and so on.

Figure 4:
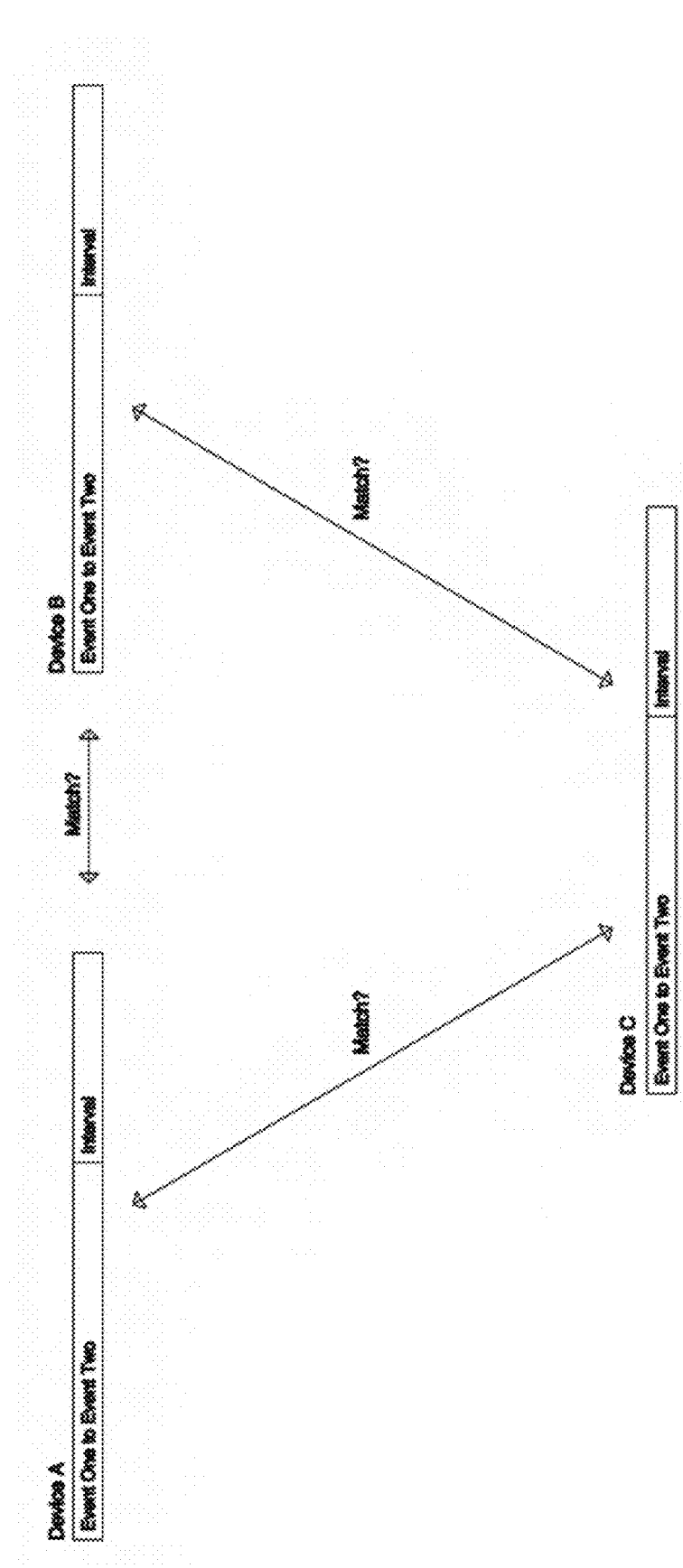
FIG. 4 shows an example of how inputs can be used to authenticate pairing of three devices and/or transfer of data between three devices.

FIG. 4 shows an example of how inputs can be used to authenticate pairing of three devices and/or transfer of data between three devices. Similar to if there were two devices, the devices recognize vibrations or movements and the time periods between those vibrations or movements. The algorithm is consistent whether there are two, three, four, or more devices being authenticated for pairing, linking, or otherwise recognizing one another, or for data transfer purposes.

Figure 5:
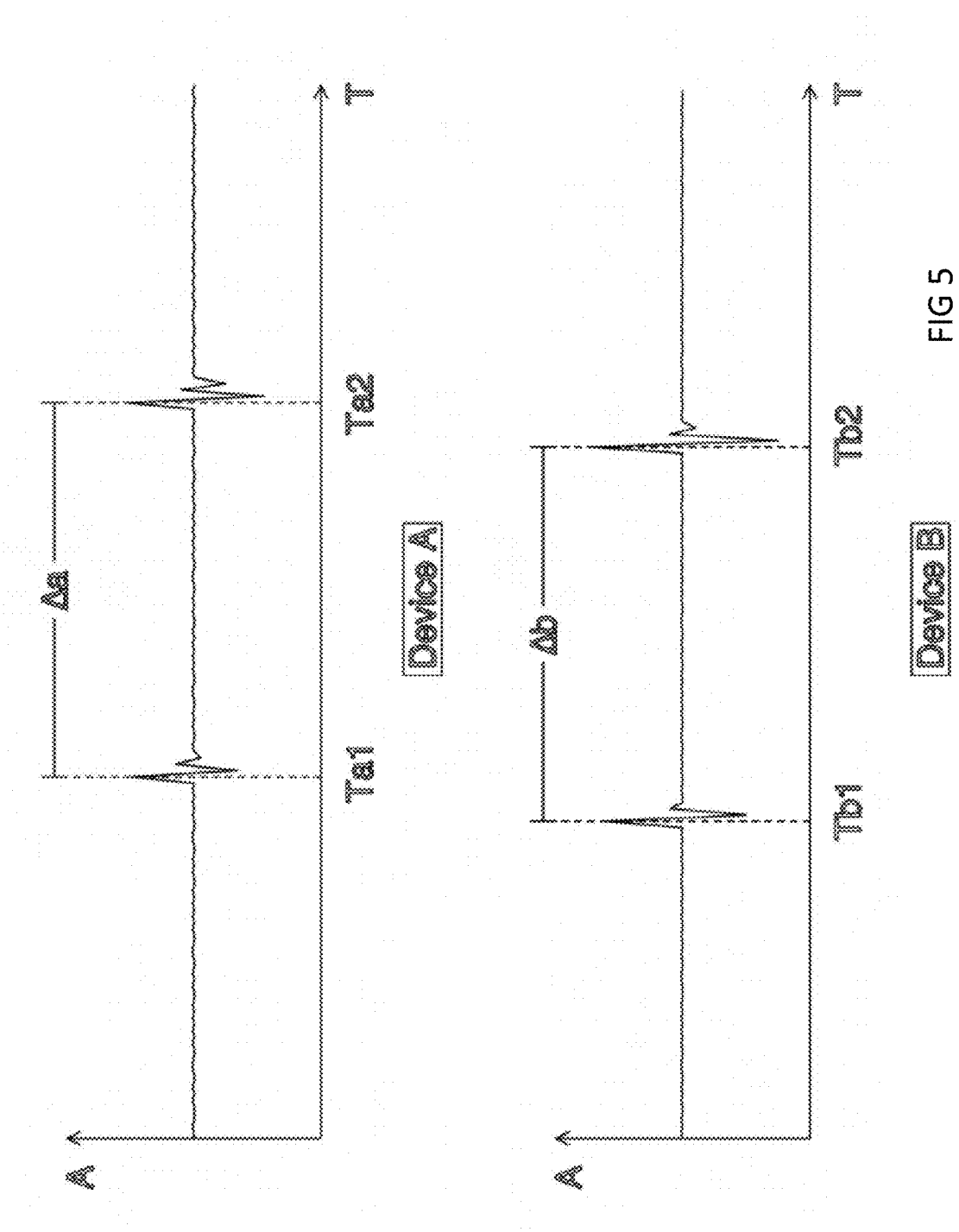
FIG. 5 shows an example of how one interval of two vibrations can be used to authenticate pairing of the devices and/or transfer of data.

FIG. 5 shows an example of how one interval of two vibrations can be used to authenticate pairing of the devices and/or transfer of data. A vibration of a particular frequency is measured at point Ta1 on Device A and point Tb1 on Device B. A vibration of a particular frequency is measured at point Ta2 on Device A and point Tb2 on Device B. The interval between those two points is notated as Δa for Device A and Δb for Device B. If Δa and Δb are similar, identical, or close enough in time to one another, the devices are authenticated.

Figure 6:
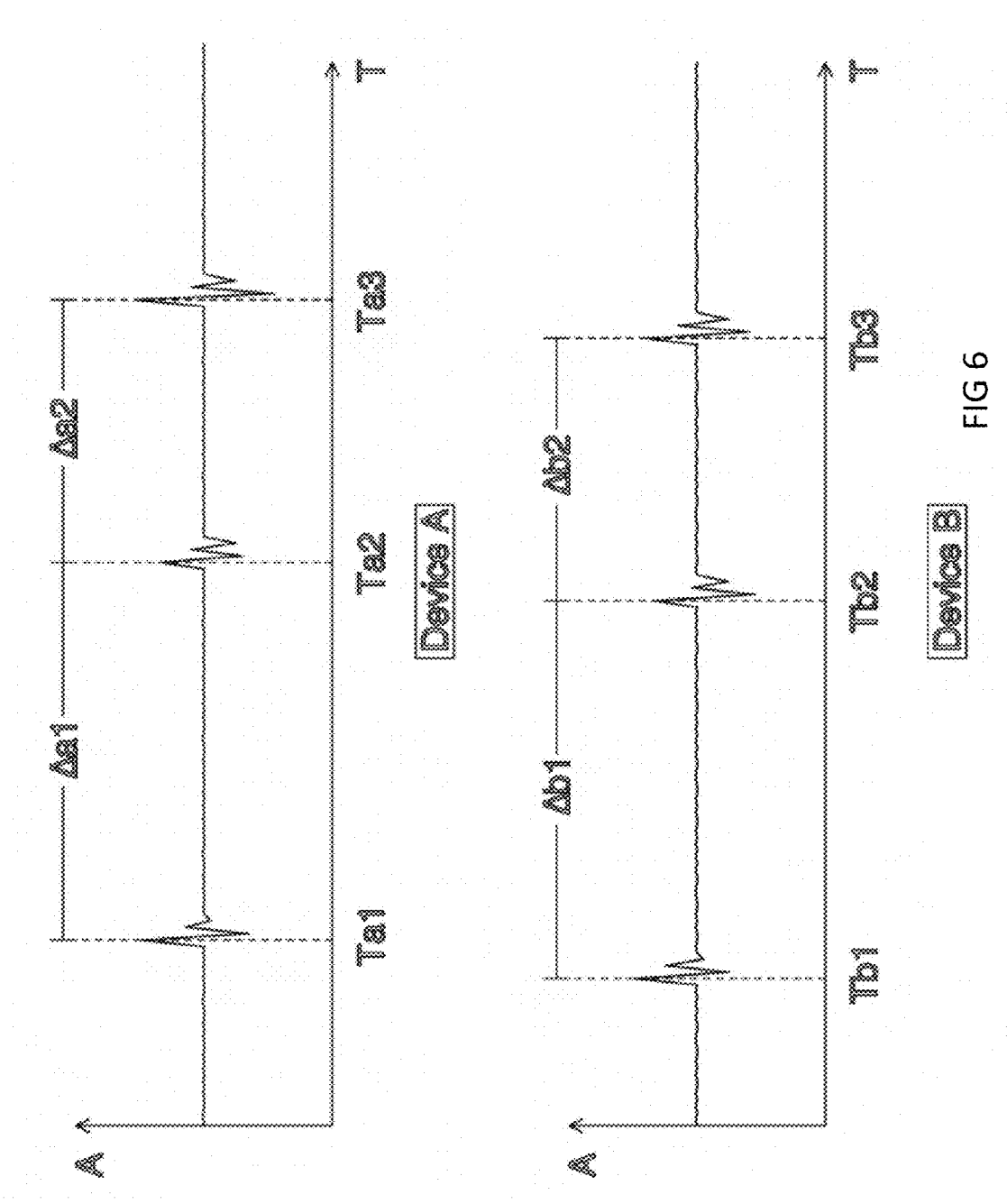
FIG. 6 shows an example of how two intervals of three vibrations can be used to authenticate pairing of the devices and/or transfer of data.

FIG. 6 shows an example of how two intervals of three vibrations can be used to authenticate pairing of the devices and/or transfer of data. Similar to the embodiment of FIG. 5, vibrations of a particular frequency are measured at point Ta1 on Device A and point Tb1 on Device B. A vibration of a particular frequency is measured at point Ta2 on Device A and point Tb2 on Device B. A vibration of a particular frequency is measured at point Ta3 on Device A and point Tb3 on Device B. The interval between those three points is notated as Δa1 and Δa2 for Device A and Δb1 and Δb2 for Device B. If Δa1 and Δb1 are similar, identical, or close enough in time to one another, and/or if Δa2 and Δb2 are similar, identical, or close enough in time to one another, the devices are authenticated.

Figure 7:
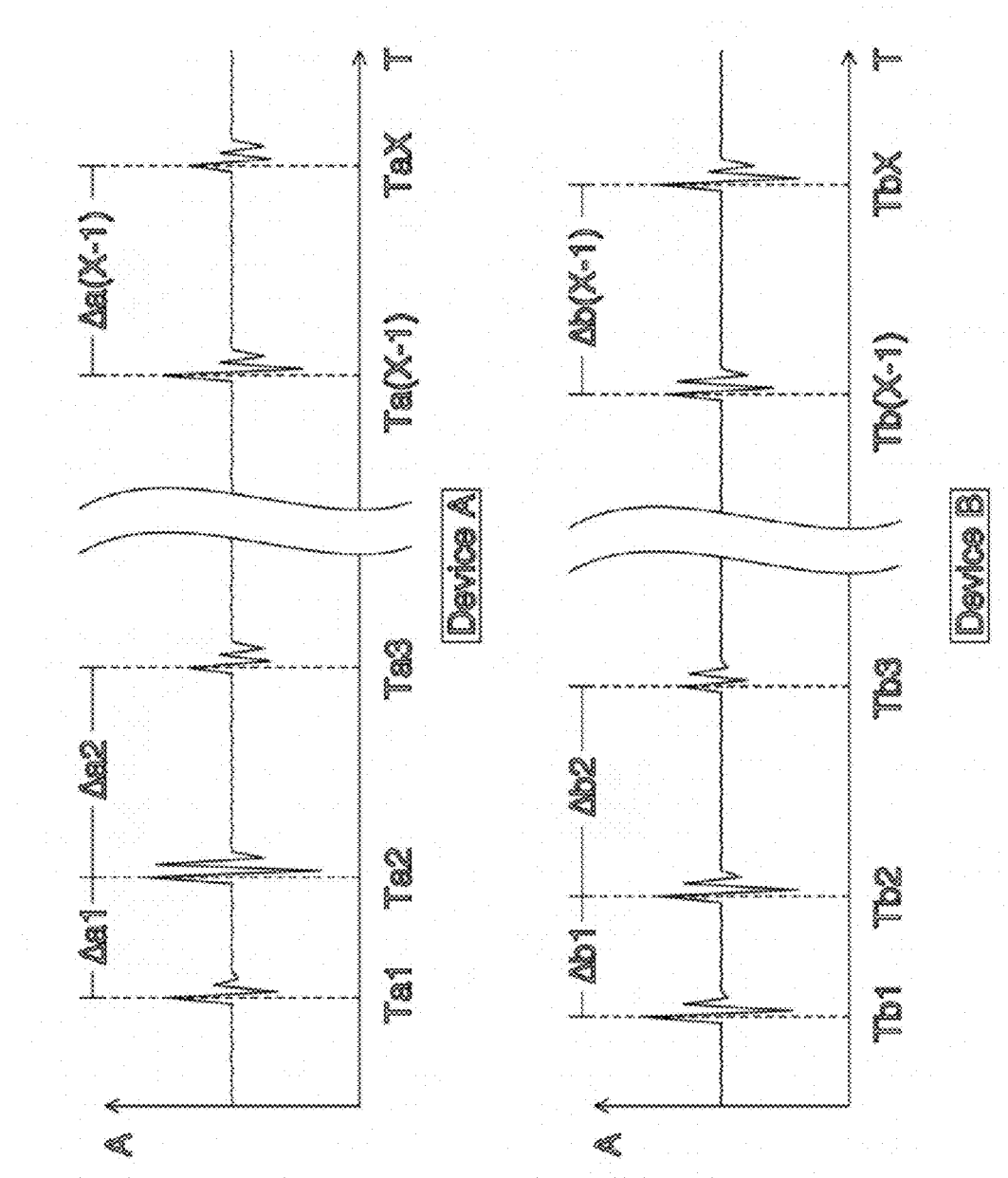
FIG. 7 shows an example of how several intervals of vibrations can be used to authenticate pairing of the devices and/or transfer of data.

FIG. 7 shows an example of how several intervals of vibrations can be used to authenticate pairing of the devices and/or transfer of data. The embodiment is similar to FIG. 6, although additional vibrations or movements may be used for authentication. For example, inputs at Ta(X−1) and Tb(X−1) may be used, and inputs at TaX and TbX will be added to complete the interval. If Δa(X−1) is similar to Δb(X−1), in addition to or instead of the intervals as notated as Δa1/Δb1 and Δa2/Δb2, the devices will be authenticated. Several intervals may increase security. Alternatively, several intervals may be used to increase the likelihood of desired authentication. For example, if one or more intervals do not match, but one or more intervals do match up, the devices may still be authenticated.

Figure 8:
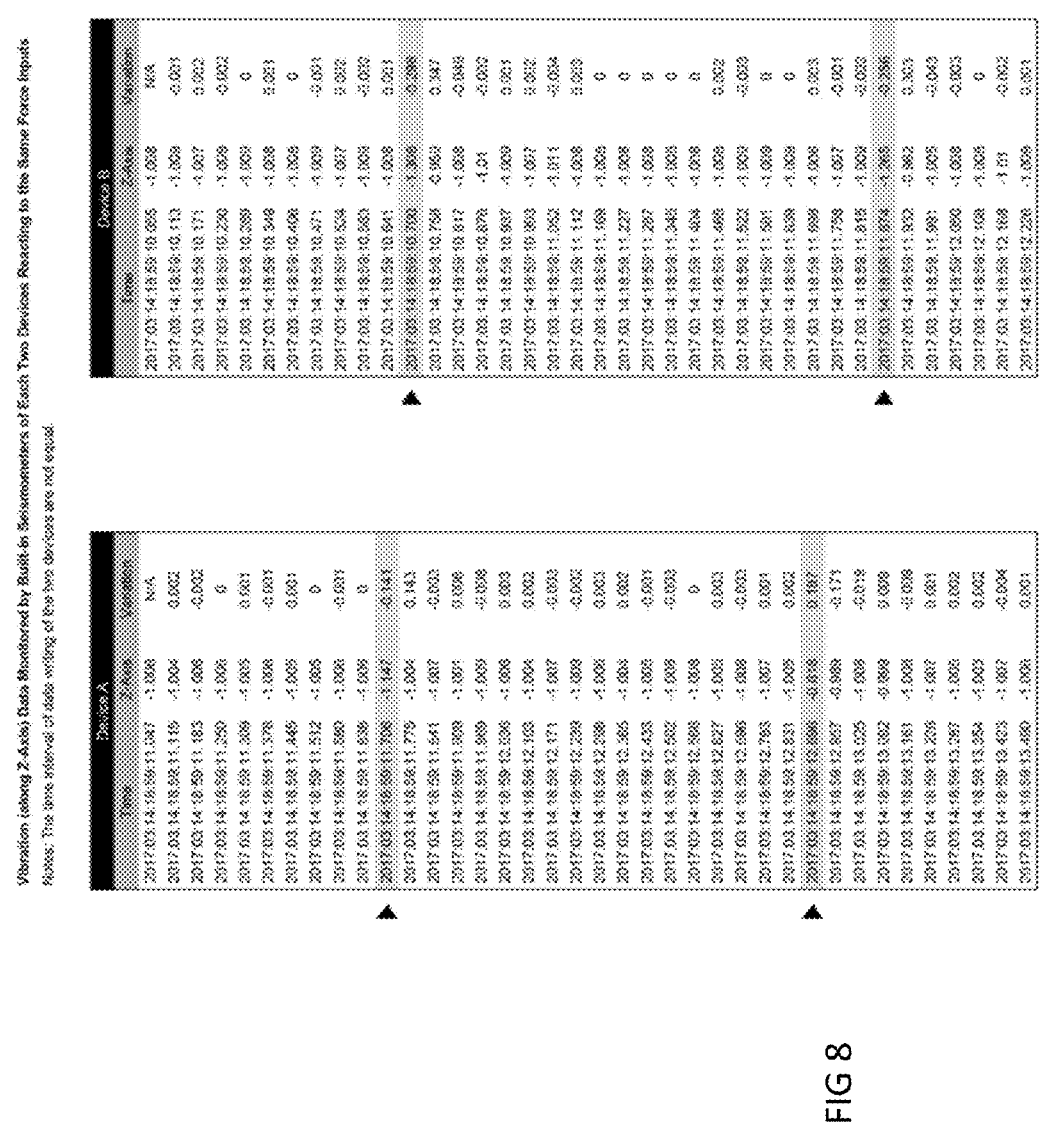

FIG. 8 shows an example of how inputs can be used to authenticate pairing of the devices and/or transfer of data, even if the two devices are not synchronized to the same clock. Two devices (Device A and Device B) experienced the same or similar two motion or vibration inputs. The built-in seismometer of each device continuously records the data of motion or vibration on the z-axis of the device or devices (or other axes). Time and amount of motion or vibration detected at a time point are noted in the first and second columns in the figure. The third column is the calculation of variation of the motion or vibration between the time point and the former time point. In the tables, the absolute value of variation is low (around 0.002) but there are times the absolute value of variation rises up to 0.1 and above, which indicates the motion or vibration input (marked with arrows). It will be noticed that even though the time of the two devices are not the same, if a processor calculates the intervals of two motions or vibrations inputted and registered by two devices, a similar number is achieved.

Figure 9:
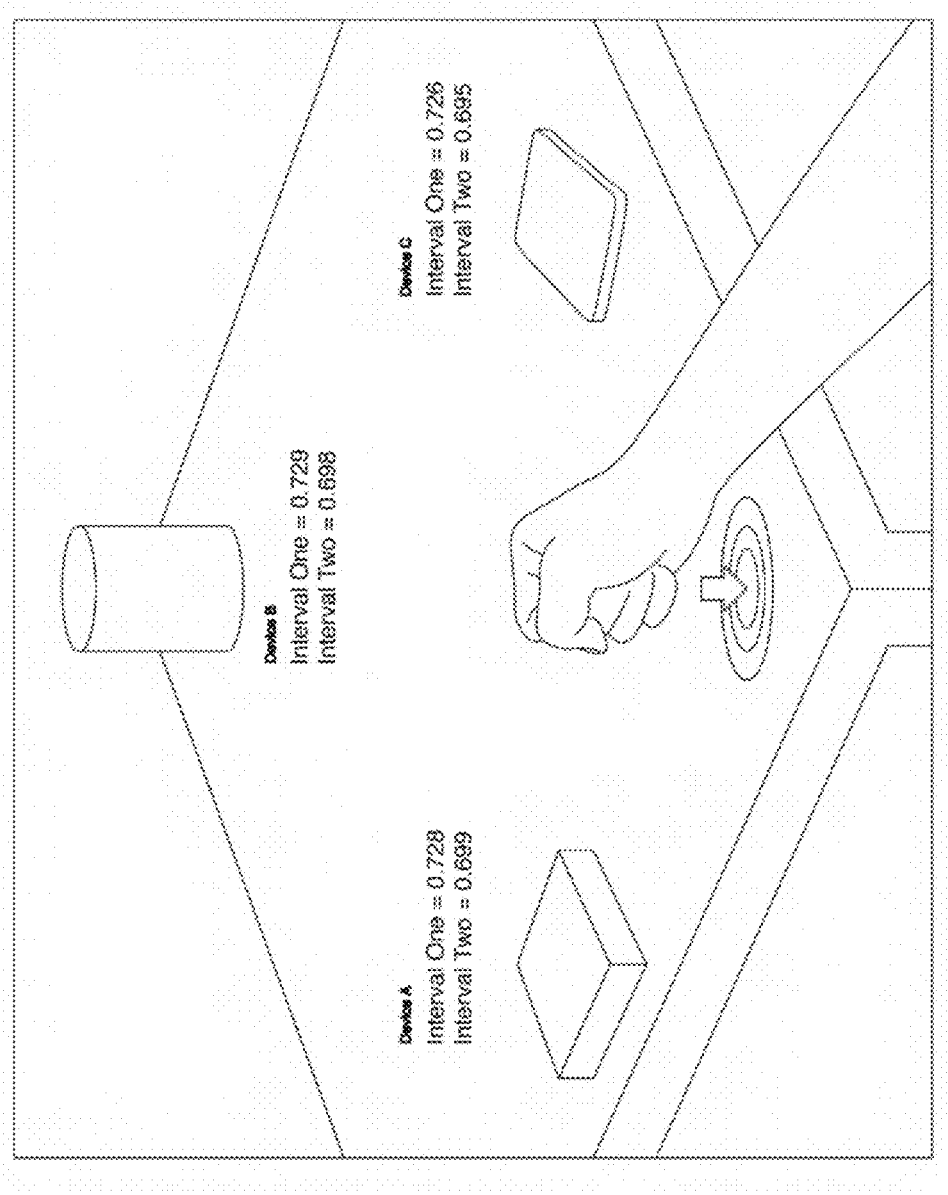
FIG. 9 shows an example of how inputs can be used to authenticate pairing of the devices and/or transfer of data between three devices.

FIG. 9 shows an example of how inputs and intervals can be used to authenticate pairing of the devices and/or transfer of data between three devices. FIG. 9 shows in more detail how intervals can be used to authenticate the devices as explained herein, and that devices may receive first, second, and/or third inputs at different times, and therefore result in different detected duration(s) of intervals between devices, and still allow for authentication of pairing.

Figure 10:
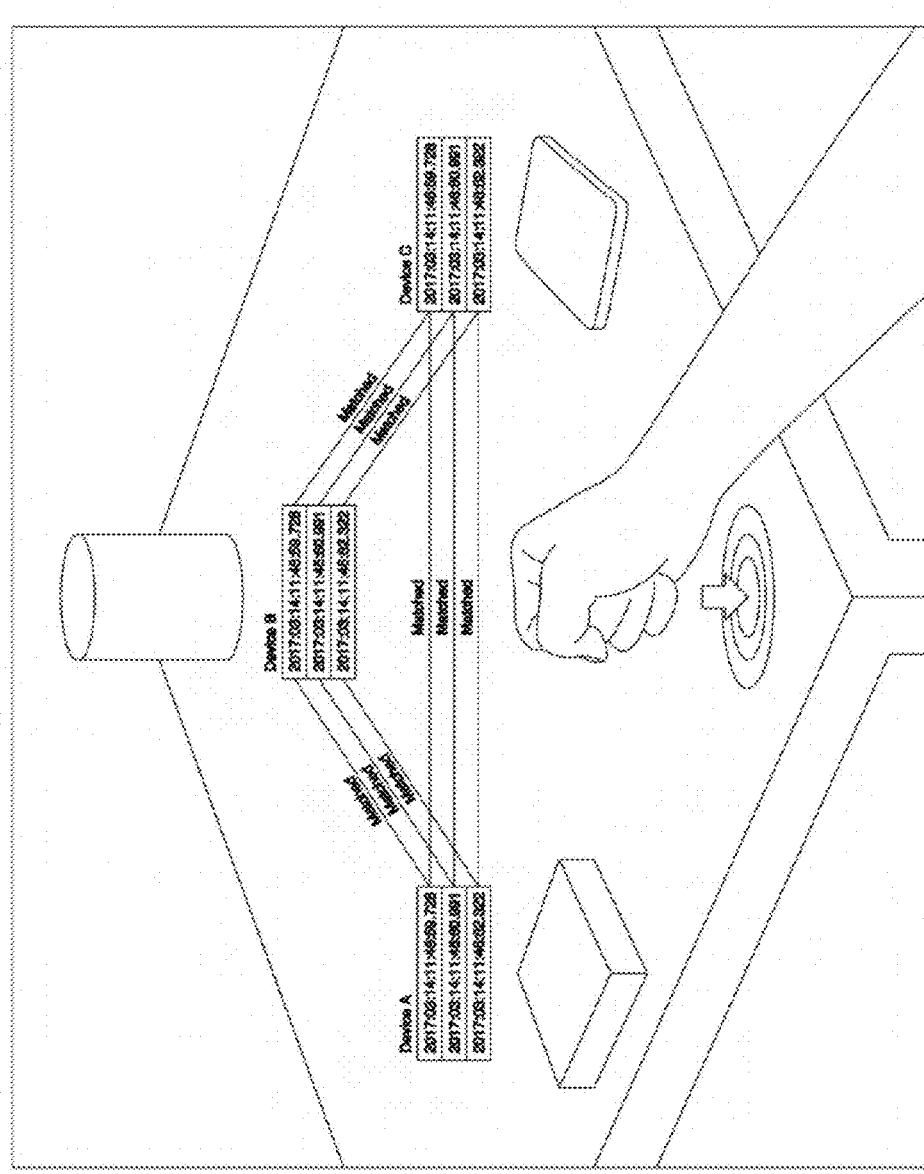
FIG. 10 shows an example of how inputs can be used to authenticate pairing of the devices and/or transfer of data between three devices.

FIG. 10 shows an example of how inputs/events can be used to authenticate pairing of the devices and/or transfer of data between three devices. FIG. 10 shows devices may receive first, second, and/or third inputs at different times, and still allow for authentication of pairing. Some variability is tolerable or allowable for when inputs/events are received or registered by the devices, if the variability is within a selected timing range of tolerable timing differences. The same is true for intervals; differences in durations of intervals between two or more devices is acceptable and the devices will still pair if the differences in the intervals are within a selected timing range of tolerable variability.

Figure 11:
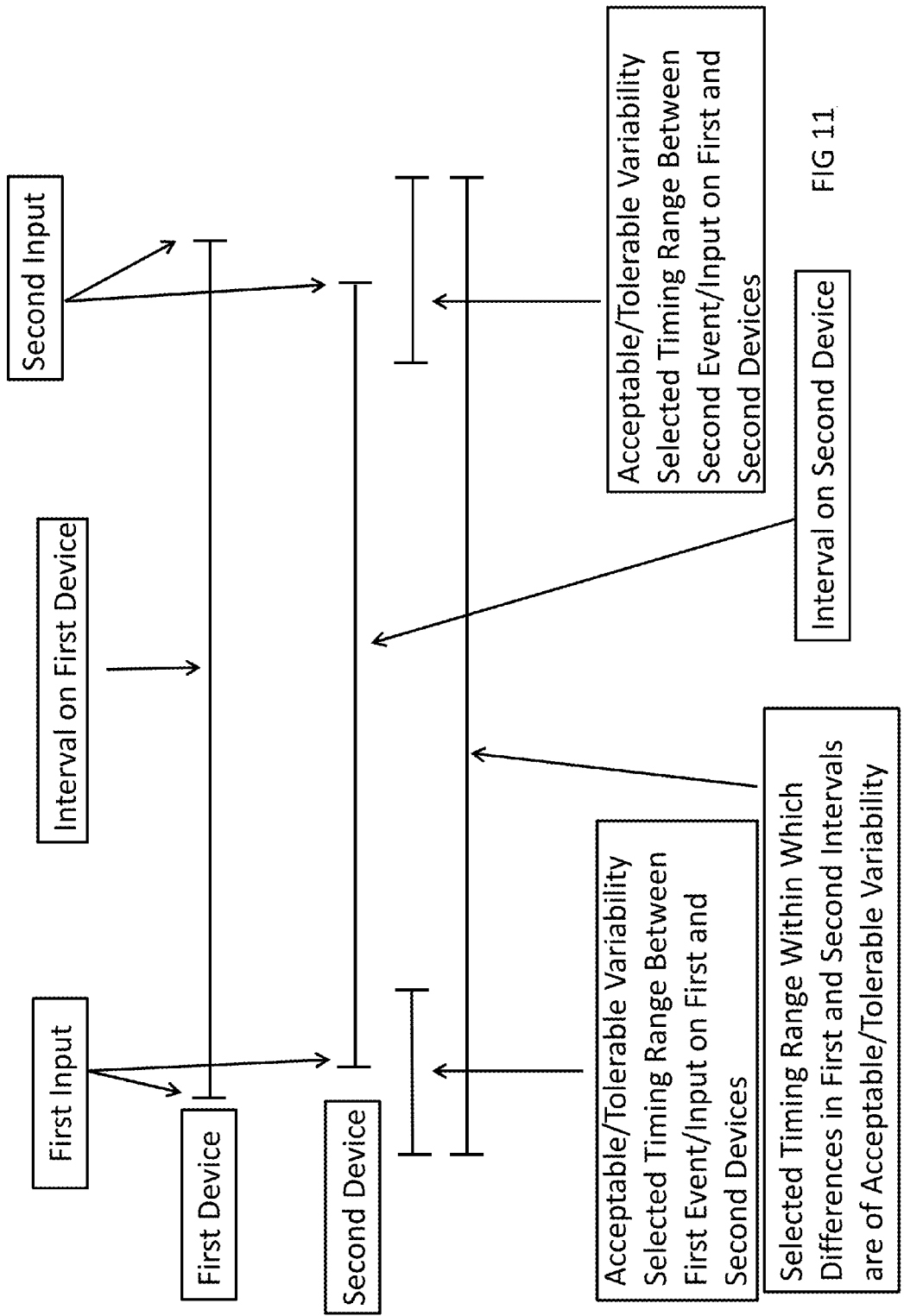
FIG. 11 shows a diagram of how variances in inputs/events and interval duration may be accounted for and still allow the devices to authenticate pairing.

FIG. 11 shows a diagram of how the invention accounts for differences in the timing of events/inputs and intervals between devices. For example, First Device receives, detects, and registers a first event and a second event. Second Device also receives, detects, and registers a first event and a second event. The first event of the First Device and the first event of the Second Device may be the same or different events. The second event of the First Device and the second event of the Second Device may be the same or different. By way of example, some variance must be allowed because, in reality, the vibrational frequencies between the events between devices will never be absolutely identical, nor will the time they are received by the different devices.

The invention taught herein allows for some variability if the variances are within selected allowable timing ranges. For example, if the first event detected by First Device is somewhat different than the first event detected by Second Device (e.g., the detection occurs at two different points in time), the differences between the devices are tolerable if they are within a selected timing range (usually around 2 seconds). If the second event detected by First Device is somewhat different than the second event detected by Second Device (e.g., the detection occurs at two different points in time), the differences between the devices are tolerable if they are within a selected timing range (usually around 2 seconds). Thus, the invention accounts for variance and the devices may still proceed to pairing.

Similarly, the invention taught herein allows for some variability in intervals experienced by two or more devices if the variances are within selected allowable timing ranges. For example, if the interval calculated by First Device is somewhat different than the interval calculated by Second Device (e.g., because the first and/or second inputs/events/vibrations/motions were detected and registered at different time periods), the differences between the devices are tolerable if they are within a selected timing range allowing for some tolerable amount of variability (e.g., usually around 2 seconds before the first event until around 2 seconds after the second event). If the interval calculated by First Device is somewhat different than the interval detected by Second Device, the differences between the devices are tolerable if they are within a selected timing range. Thus, the invention accounts for variance and the devices may still proceed to pairing.

Figure 12:
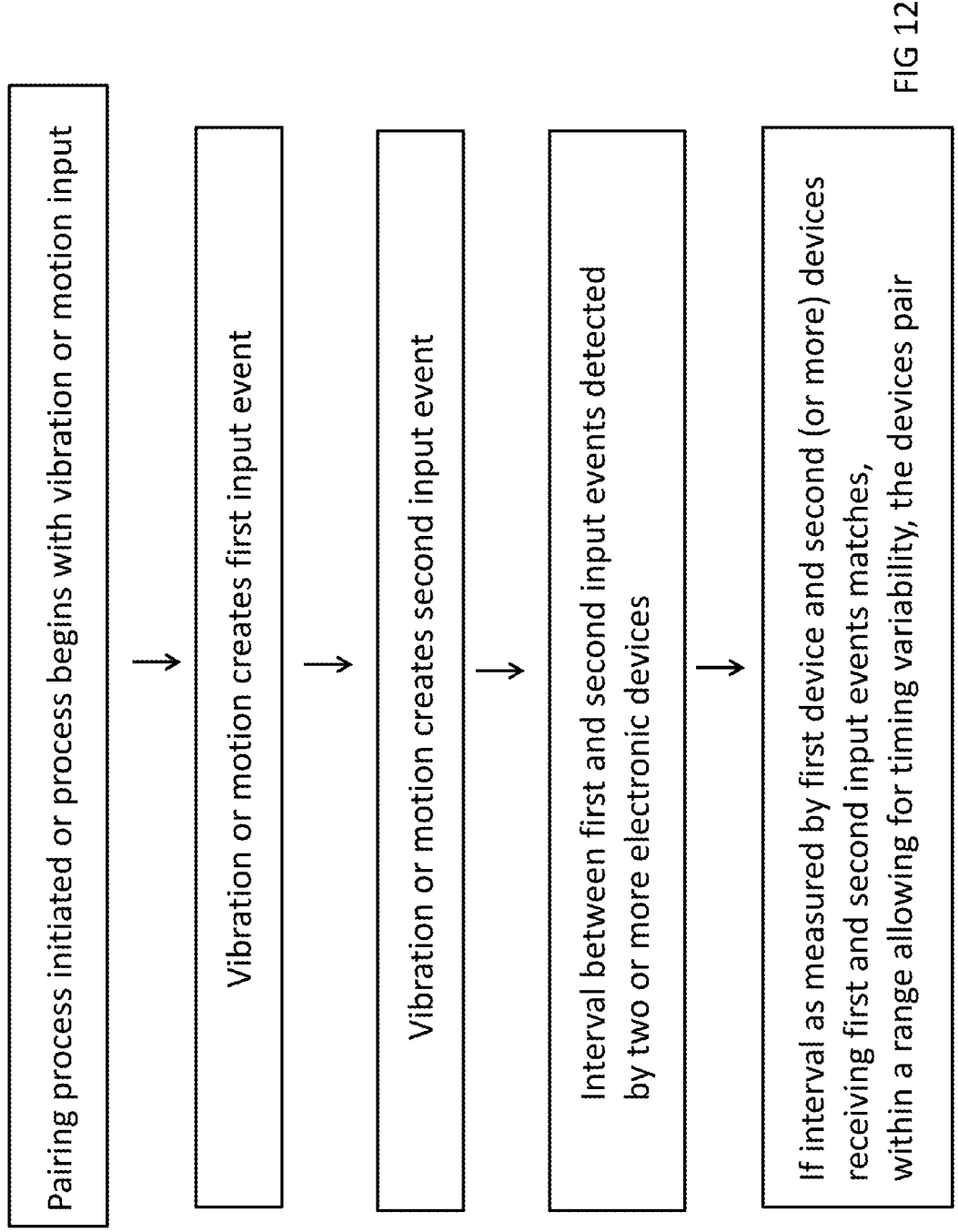
FIG. 12 shows an exemplary flowchart of pairing two or more devices according to the invention taught herein.

FIG. 12 shows a possible flowchart of events that might occur for two or more devices to be paired as taught herein.

Figure 13:
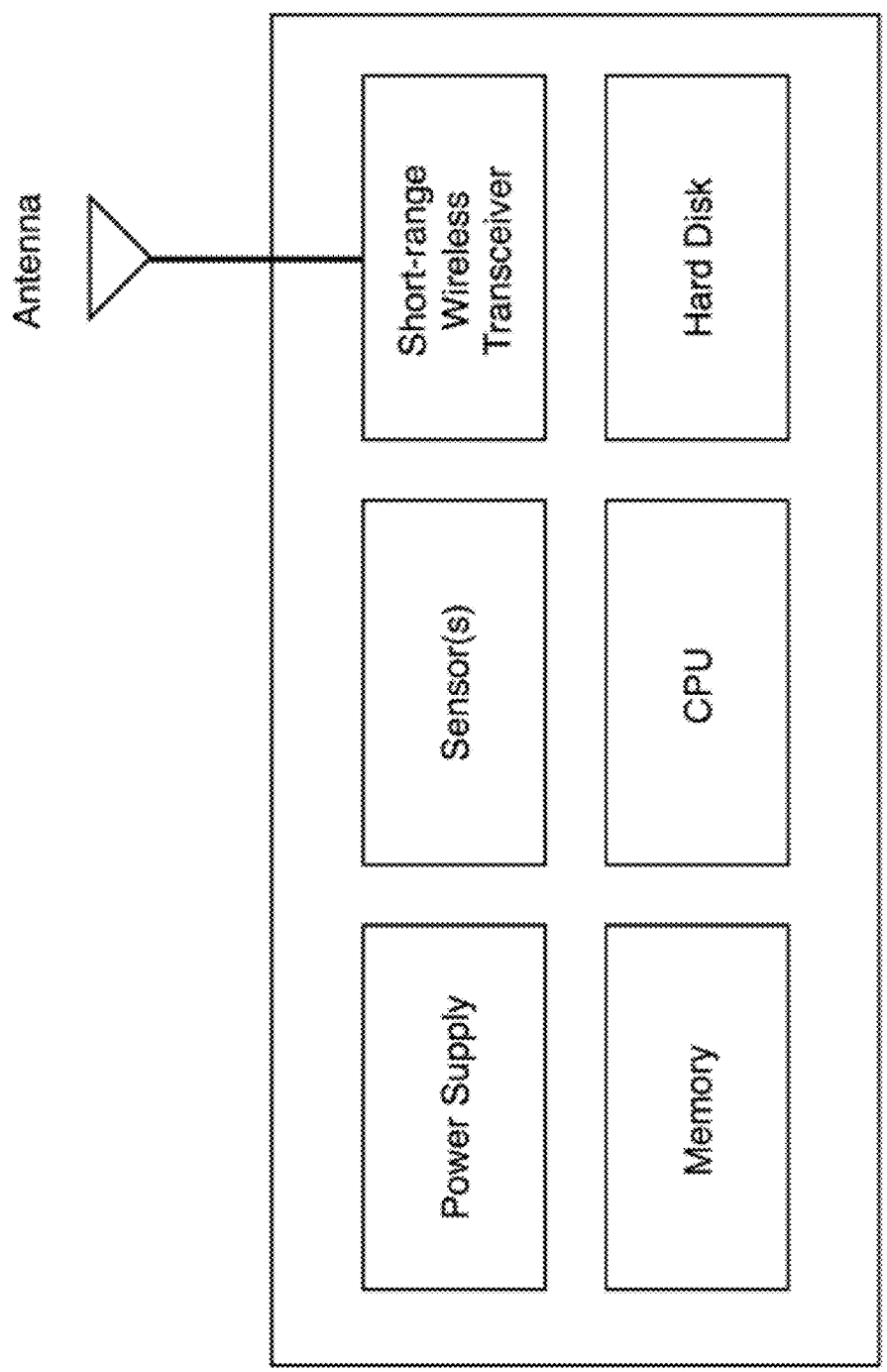
FIG. 13 show a diagram of an exemplary device as taught by the invention disclosed herein.

FIG. 13 shows a diagram of a device as taught herein that could perform the pairing authentication according to the present invention.

Example One

To pair a VR device and a wireless headphone, put the VR device and the wireless headphone on the same table in proximity to one another. Knock the table anywhere more than one time to create vibrational inputs.

Example Two

To share and/or transfer an image file from one cellular phone to another one, two, or more cellular phones, stack and hold, for example, three cellular phones together in one hand and shake them in the air more than one time until they indicate successful transferring. Or, pair one or more cellular phones with another one, two or more cellular phones, by stacking and holding the phones to be paired together and shaking them more than one time.

Example Three

To pair the watch on your left wrist with a public service machine, knock the machine with your left hand on the public service machine more than one time.

Example Four

In an example of pairing automatically, a device user may be driving a vehicle. A tablet and/or cellular phone inside the vehicle receives the same acceleration inputs that result from speeding up and/or slowing down, stopping, starting, turning, and/or other movements of the vehicle as the in-vehicle computer system and the tablet pairs automatically based on the those motion inputs, without the user's attention. Accordingly, device pairing according to the invention taught herein is not dependent on user input, but rather may occur automatically as a result of other motions, such as the motion of driving or operating a vehicle, such as a car, truck, motorcycle, ATV, boat, plane, etc.

Example Five

Two electronic devices in pairing mode may detect the blinkings of an eye through each device's built-in camera module; the intervals of eye blinkings are used to authenticate pairing.

Example Six

To pair a digital music player (including a cellular phone) and a speaker in order to play the music from the player on the speaker, a user may play music from the digital music player, and the digital music player and the speaker will receive and record the same (or almost identical) vibrations or motions from the sound being played. The interval(s) of the moments of the vibrations or motions may be used to authenticate pairing of the player and the speaker. After successful pairing, the speaker will take over playing the music from the player.

Example Seven

Stack two flexible display devices and bend them. The interval between the beginning and ending of the deformation (and/or interval(s) between the beginning and the ending of the deformation) of the display devices are used to authenticate the pairing of the two devices, or the amount of deformation is used to pair the devices.

Example Eight

Two cellphones receive a signal to enter pairing mode and each receives two motions. Even though the clocks are not synchronized, the intervals are the about same (e.g., a 2 second variable tolerance is allowable) so the cellphones pair successfully based on the interval(s).

Example Nine

Two devices with touch sensitive screens each receive the same or similar touch gesture, and the interval(s) between the beginning and the ending of the touch gestures are used to authenticate pairing.

Example Ten

In another example, a computer software application for performing the authentication taught herein is downloaded to the device or otherwise loaded onto the device, such as pre-loaded by the manufacturer. To begin the pairing process, a user or users open the application on the two or more devices to be paired, although in certain aspects the application is running or executing in the background without having to be manually activated by a user. The application then alerts the user or users to begin the vibration or motion process and the devices receive a signal to enter into pairing mode. In another aspect, the user or users can create vibration(s) or motion process(es) without having to manually enter pairing mode and/or be alerted to begin the input process. The user or users may create their own vibrations or motions, or the device will instruct them on the vibration(s) or motion(s) to be performed. If the vibration(s) or motion(s) result in authentication between the two or more devices, the devices will notify the user or users and request permission to authenticate, pair, transfer data, or otherwise create recognition between the devices. Thus, accidental pairing will not occur. If permission is granted, a secure connection with the other one or more devices is established based on the exchanged pairing data. Also, the period for creating vibrations or performing motion will time out after a certain period of time, such as after 10 seconds.

In some aspects, the vibration or motion information is used to establish a secure connection between the first device and the second or more device(s), and the devices exchange data for pairing through the secure connection.

One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A method of authenticating pairing between two or more electronic devices comprising:
   two or more electronic devices receiving a first vibration or motion detected from one or more sensors coupled to the two or more electronic devices and registering a first event by storing in memories and processing in computer processing units coupled to the two or more electronic devices;
   said two or more electronic devices receiving a second vibration or motion detected from the one or more sensors coupled to the two or more electronic devices and registering a second event by storing in the memories and processing in the computer processing units coupled to the two or more electronic devices;
   a first electronic device of the two or more electronic devices registering an interval between the first and second events registered on the first device by storing in the memory and processing in the computer processing unit coupled to the first electronic device;
   a second electronic device of the two or more electronic devices registering an interval between the first and second events registered on the second device by storing in the memory and processing in the computer processing unit coupled to the second electronic device;
   the first electronic device transmitting to the second electronic device the first device's registered first event, the first device's registered second event, and the first device's registered interval between the said first device's first and second events;
   the second electronic device receiving from the first electronic device the first device's registered first event, the first device's registered second event, and the first device's registered interval between the said first device's first and second events;
   the second electronic device comparing the first device's registered first event to the second device's registered first event, comparing the first device's registered second event to the second device's registered second event, and comparing the first device's registered interval between the said first device's first and second events to the second device's registered interval between the said second device's first and second events;
   the second electronic device calculating if differences between the first event for the first device and the first event for the second device are within a selected timing range;
   the second electronic device calculating if differences between the second event for the first device and the second event for the second device are within a selected timing range;
   the second electronic device calculating if differences between the registered interval for the first device and the registered interval for the second device are within a selected timing range; and
   allowing for pairing between, authenticating pairing between, transferring data between, and/or connecting the two or more electronic devices if any differences between the first event for the first device and the first event for the second device are within the selected timing range for the first event, if any differences between the second event for the first device and the second event for the second device are within the selected timing range for the second event, and/or if any differences between the interval for the first device and the interval for the second device are within the selected timing range for the interval.

2. The method of claim 1, wherein pairing mode is initiated in one or more of the two or more electronic devices before the first vibration or motion.

3. The method of claim 1, wherein pairing mode is initiated in one or more of the two or more electronic devices after the first vibration or motion.

4. The method of claim 1, wherein pairing mode is initiated in one or more of the two or more electronic devices by the first vibration or motion.

5. The method of claim 1, wherein pairing is achieved by exchanging data between the two or more electronic devices.

6. The method of claim 1, wherein the first and/or second vibration or motion is caused by movements of a vehicle.

7. The method of claim 1, wherein the two or more electronic devices are cellular phones, tablet computers, watches, laptop computers, computer processors, machines that communicate wirelessly, or combination(s) of these.

8. The method of claim 1, wherein the first and/or second vibration are created by sound.

9. The method of claim 1, wherein the first and/or second motion are created by visual cues.

10. The method of claim 1, wherein the first and/or second motion comprise visual cues captured by the two or more electronic device's integrated or remote cameras.

11. The method of claim 1, wherein the first and/or second motion comprise activating graphical user interface component(s) on one or more of the two or more electronic devices.

12. The method of claim 1, wherein the first and/or second motion comprise activating physical component(s) on one or more of the two or more electronic devices.

13. The method of claim 1, wherein the first and/or second motion comprise a pattern or patterns of motion(s), acceleration, tilt, rotation, a biometric motion input, magnetic motion, electromagnetic motion, wind motion, applying pressure, and/or deformation of a flexible, foldable, and/or stretchable surface and/or device.

14. The method of claim 1, wherein the first and/or second vibration comprise a pattern or patterns of vibration or a vibration frequency.

* * * * *